Patented Feb. 24, 1931

1,794,270

UNITED STATES PATENT OFFICE

GOTTLIEB ACKERMANN, OF BERLIN, GERMANY

PRESSURE REGULATOR AND SAFETY VALVE

Application filed February 4, 1928, Serial No. 251,981, and in Germany October 14, 1926.

This invention relates to pressure regulators. An object of the invention is to provide a device adapted to shut off the pressure medium supplied to pressure-operated apparatus of any kind on a predetermined maximum pressure being reached, and to restore the supply of the said pressure medium on the pressure in the receiving pipe or chamber of the apparatus falling below a predetermined minimum. Another object is to enable a device as aforesaid to act as a safety valve exhausting into the atmosphere when excessive pressure occurs, and closing when such excessive pressure has been relieved. Further objects and advantages of the invention will be apparent from the following description read in conjunction with the accompanying drawings.

The casing $a$ of the regulator is connected by means of a branch $b$ to a pressure reservoir (not shown). $c$ is a valve body in the form of a hollow piston which has at the bottom end a seating surface $d$ of a given diameter, and at the upper end the considerably greater annular seating surface $e$ which, on the valve body $c$ rising, engages with the equally large seating surface $f$ of a regulating screw $g$ preferably arranged concentrically with the valve body $c$. The valve body $c$ is mounted with a certain amount of play in a cylindrical portion of the casing $a$ in such a manner that it leaves free a given annular cross section. The regulating screw $g$ is intended for the regulation of the lift of the valve body $c$. The size of the area bounded by the upper valve edge $e$ must be dimensioned in such a manner that the pressure acting on an equally large surface of the valve body at the maximum valve lift exceeds by a slight amount the force of the spring tension which is at the maximum at this moment. In a second cylindrical chamber which is connected to the chamber of the valve $c$ by a conduit $h$, is mounted the well known control piston $i$ with the seating surface $k$ which, when the valve $c$ is opened, engages with a seating disc provided in the end $l$ of its chamber. The hollow piston shaped valve body $c$ receives in its hollow space a suspension device $m$ which projects through a tubular projection $n$ and engages with a tension spring $o$ which latter engages by means of a suspension device $p$ with the sleeve $q$. This sleeve is intended for regulating the spring tension and therefore the pressure at which the valve movement takes place. The said sleeve $q$ is externally screw threaded for adjustment in an internally threaded portion of the casing $a$ and is provided with a locknut $r$. The outer surface of the tubular projection $n$ is shaped in such a manner that the air gap round the said projection changes during the lifting of the valve body $c$ in a given ratio to the tension of the spring $o$, which increases with the lifting of the valve body. The rounded outer end of the piston $i$ is under a pressure tending to return it, so that when the pressure acting as aforesaid to move it to the end $l$ of its chamber is removed, for instance by escape of air through the borings in the screw $g$, it returns to the position illustrated.

Figure 1:
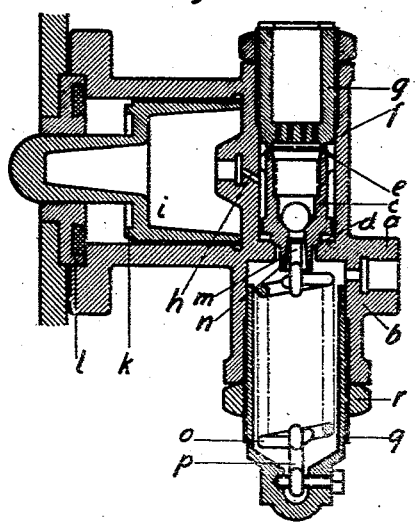
Figure 1 represents in longitudinal section a construction exemplifying the invention.
Figure 2:
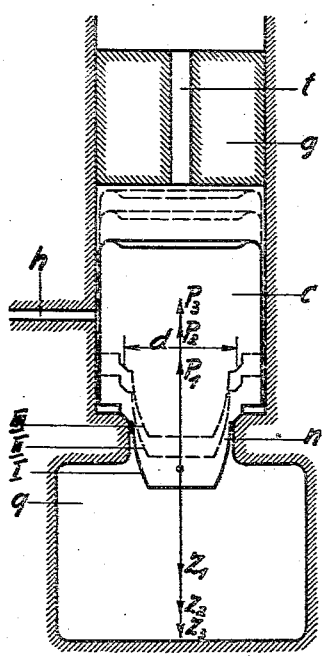
Figure 2 is a diagram intended to facilitate the explanation of the working of the regulator.

The working of the device will now be explained with reference to Figure 2.

In the cylinder $a$ is loosely guided the piston $c$ which does not completely fill the interior of the cylinder, but leaves a narrow annular space which is sufficiently large to afford passage to the quantity of air required for the movement of the control piston $i$. The piston $c$ is pulled by a tension spring against a valve seat with the mean seat diameter $d$. The tractional force then exerted by the spring $o$, may be called Z1. This force Z1 acts in opposition to a force P1 which represents the pressure of the pressure medium stored in the tank. If the force P1 becomes by a small amount greater than the force Z1, the piston $c$ will be lifted off the seat $d$. This will open around the bottom projection $n$ of the piston $c$ an annular gap which must be exactly so large that the pressure medium passing through the gap exercises on the additional surface III an additional action which is added to the force P1 and has the tendency to still further raise the piston 3. In the absence of the part $n$ projecting below the valve seat, the lower surface of the piston $c$ would only be exposed uniformly to the static pressure of the pressure medium, but due to the presence of this part $n$ having a convexly tapering configuration, the dynamic or flow pressure of the pressure medium is variable according to the extent to which the piston $c$ is lifted. After a sufficient fall of pressure, the piston would start on its return movement. If the piston admission were free, that is to say if the admission cross section for the driving medium were sufficiently large and remained without modification, the return would take place slowly in accordance with the fall of pressure. In addition to the initial fall of pressure which is required for starting the return movement of the piston, it would be necessary to have quite a considerable additional fall of pressure, in order that the return movement of the piston should be quite completed. In order to bring about in the construction, according to the invention, an instantaneous closing of the valve piston, the admission to the valve piston during its movement is regulated by the piston projection $n$. This piston projection changes the cross sectional areas of passage in each lift position of the piston valve in such a manner that, in spite of the variable spring resistance, the piston is practically in equilibrium in any lift position, that is to say the spring forces $Z1, Z2, Z3$, etc., are counteracted at any time by the forces $P1, P2, P3$, etc., which are to a small extent greater than the corresponding spring forces. The difference between the sums of the P and Z forces determines the pressure fall at which the valve drops freely on its seat.

Assuming that the piston is in the position II, the projection $n$ will leave free a passage which will allow so much pressure medium to pass that the resultant pressure (static plus dynamic pressure) $P1+P2$ will be somewhat greater than the spring pressure $Z1+Z2$.

Assuming that the piston is in another position III, the projection will again leave free a greater cross sectional area of passage, so that to the spring resistance $Z1+Z2+Z3$ will correspond a greater pressure force $P1+P2+P3$. If the possible number of the various piston positions and the cross sectional area of passage corresponding to them, are represented, the shape of the piston projection $n$ will be obtained, theoretical calculation of which is very difficult, but it can be easily determined by practical experiments.

When the piston reaches in its end position the stop $g$, it will be held fast on the seat by the tank pressure which now acts statically, in opposition to the tension of the spring.

Let it be assumed for instance that the piston $i$ controls an electric circuit and that the switching out pressure in the tank equals 6 atmospheres, and that the area of the piston portion enclosed by the seat $e$, is equal to 5 square centimeters, then the static pressure which holds the piston $c$ fast in the end position will be 30 kilogrammes. The spring tension in this lift position amounts to 29 kg. The return movement of the piston then takes place at a pressure drop of 0.2 atm. According to the preceding considerations, during the return of the piston, the pressure medium admission opening will be throttled by the projection $n$ in such a manner that the pressure action of the pressure medium on the piston will decrease at a rate more rapid than that of the decrease in the tension of the spring. Consequently, the piston will at once drop back on its seat. The pressure medium contained in the cylinder space for the control piston, will escape through the conduit $h$, and round the piston $c$, through the atmospheric air conduit $t$. Owing to the return of the control piston $i$, the current is switched on again. If the position of the stop $g$ is changed by placing it lower, whilst the switching out pressure is maintained at 6 atm., the spring tension with the fully raised piston valve will of course become smaller; it may amount for instance to 25 kg. In order to bring about the renewed switching in movement, a pressure fall of 1 atm. must take place in the tank. It will be seen from the example chosen that it is possible to set the device for any desired pressure difference within the conditions limited by the means used.

The conduit $t$ (Figure 2) can be so dimensioned that when the piston valve rises, the pressure medium allowed to pass by the piston will escape into the atmosphere without any pressure. On the contrary during the return movement of the piston $c$ obstruction may occur by the pressure medium still entering through the conduit $h$, which produces a very slight additional pressure in the direction of closing which balances inaccuracies of manufacture of the spring and of the piston.

The pressure regulator according to the invention has the advantage over the well known pressure regulators in that its construction is simpler, as it avoids the use of diaphragms with their well known drawbacks, as well as of pressure springs which always produce lateral pressure with consequent canting and friction; and it enables the switching out limit, as well as the limit of switching in again, to be regulated independently of each other and each separately with the use of a single spring, namely a tension spring.

What I claim and desire to secure by Letters Patent of the United States is:—

1. In a pressure regulator, a casing including a valve seat, a branch for the admission of pressure medium to the interior of said casing in front of said seat, an extension communicating with the interior of said casing behind said valve seat, an operative piston movable in said extension by the pressure medium, a piston valve annularly spaced from said casing to co-operate with said seat to control the flow of said medium to said extension, a plug bored to give communication with the atmosphere and adjustable to limit the opening stroke of said piston valve, a tubular screw threaded extension in front of said seat, a screw threaded socket longitudinally adjustable in relation to said tubular extension, a spring in tension connected to said socket and to said piston valve and opposing the action of the pressure medium on the latter, said piston valve being provided at the end remote from the seat with a seating surface to engage said plug to cut off the communication with the atmosphere through said plug, and also being provided with a convex projection to throttle the flow of the pressure medium to a variable extent as the valve opens.

2. A pressure regulator, particularly adapted for compressors and the like having a control piston controlled by a piston valve, characterized by the fact that the piston valve regulates the stroke on cutting out and the liberation of air on the control piston being again placed in circuit, this said piston valve being annularly spaced from a casing and impelled by a spring, the said valve having at one end a seating surface opposite an opening to the atmosphere and adapted to close off the interior of the casing from the atmosphere when a part of the said surface is placed under atmospheric pressure while the static container pressure exerted upon the opposite frontal surface of the piston valve overcomes the force of the said spring, and by the fact that the piston valve has a projection projecting into the communication aperture between the container and the passage leading to the control piston, the said projection tapering in such manner that upon the lifting of the piston valve with the increasing widening of the annular slot forming around the said projection the pressure of flow increases more rapidly than the resistance of the spring, but upon the return stroke the flow pressure decreases more rapidly than the impulse of the spring.

3. In a pressure regulator, a casing including a valve seat, means for the admission of pressure medium to the interior of said casing in front of said valve seat, an operative device, a connection between said casing and the operative device, a plug above said valve seat and adapted to give communication between said operative device and the atmosphere, a piston reciprocable in said casing and comprising at one end a valve to co-operate with said valve seat to control the admission of said pressure medium to said operative device and at the other end a seating surface to cooperate with said plug to cut off communication between said operative device and the atmosphere, an adjustable spring below said valve seat and tending to effect the closure of said valve, said plug being adjustable independently of said spring to limit the stroke of the piston and to regulate the pressure at which the closure of the valve and the atmospheric relief of the operative device begin.

GOTTLIEB ACKERMANN.